United States Patent
Gillet et al.

(10) Patent No.: US 8,336,919 B2
(45) Date of Patent: Dec. 25, 2012

(54) SNAP-ON COUPLING FOR CONNECTING A FLUID PIPE TO A RIGID END FITTING WITH A CONNECTION INDICATOR AND METHOD OF INSPECTING THIS CONNECTION

(75) Inventors: Damien Gillet, Chateau-Renard (FR); Luc Milanini, Corquilleroy (FR)

(73) Assignee: Hutchinson, Paris (FR)

( * ) Notice: Subject to any disclaimer, the term of this patent is extended or adjusted under 35 U.S.C. 154(b) by 395 days.

(21) Appl. No.: 12/632,195

(22) Filed: Dec. 7, 2009

(65) Prior Publication Data
US 2010/0276924 A1 Nov. 4, 2010

(30) Foreign Application Priority Data

Apr. 30, 2009 (FR) ...................................... 09 02113

(51) Int. Cl.
*F16L 35/00* (2006.01)
(52) U.S. Cl. .............................. 285/93; 285/82; 285/319
(58) Field of Classification Search .................... 285/93, 285/82, 319
See application file for complete search history.

(56) References Cited

U.S. PATENT DOCUMENTS

| | | | |
|---|---|---|---|
| 7,128,347 B2 * | 10/2006 | Kerin ............................. | 285/305 |
| 7,390,025 B2 * | 6/2008 | Pepe et al. ....................... | 285/93 |
| 7,484,774 B2 * | 2/2009 | Kerin et al. ..................... | 285/305 |
| 7,802,822 B2 * | 9/2010 | Poder et al. ..................... | 285/93 |
| 2005/0218650 A1 * | 10/2005 | Pepe et al. ..................... | 285/308 |
| 2005/0230968 A1 * | 10/2005 | Takayanagi et al. ............ | 285/93 |
| 2008/0136163 A1 * | 6/2008 | Okada .............................. | 285/2 |
| 2010/0032937 A1 * | 2/2010 | Kerin et al. ...................... | 285/3 |
| 2010/0052313 A1 * | 3/2010 | Ishida et al. ..................... | 285/93 |
| 2010/0127492 A1 * | 5/2010 | Poder et al. ..................... | 285/93 |

FOREIGN PATENT DOCUMENTS

| | | |
|---|---|---|
| EP | 1 359 361 A1 | 11/2003 |
| EP | 1 582 800 A1 | 10/2005 |
| EP | 1 719 944 A2 | 11/2006 |
| EP | 1 770 321 A1 | 4/2007 |
| FR | 2 795 156 A1 | 12/2000 |
| FR | 2 910 109 A1 | 6/2008 |

OTHER PUBLICATIONS

Preliminary Search Report for Application No. FR 0902113 completed Nov. 19, 2009.

* cited by examiner

*Primary Examiner* — Aaron Dunwoody
(74) *Attorney, Agent, or Firm* — Alston & Bird LLP

(57) ABSTRACT

The present invention relates to a snap-on coupling between a fluid pipe and a rigid tubular end fitting, this coupling having a sleeve mounted on a pipe to be coupled to an end fitting that has a peripheral connecting projection, a locking member engaging with this projection to retain the end fitting in the sleeve, and a visual indicator which engages with the projection behind the locking member and occupying an extended position and a depressed position in the sleeve, the member and the indicator each having a head and two elastically deformable side legs, each leg of the indicator having a retention arm engaging with a lower side tooth and with a bottom stop, both formed on the corresponding side of the sleeve, when the indicator occupies the depressed and extended positions, respectively.

13 Claims, 12 Drawing Sheets

ABSTRACT# SNAP-ON COUPLING FOR CONNECTING A FLUID PIPE TO A RIGID END FITTING WITH A CONNECTION INDICATOR AND METHOD OF INSPECTING THIS CONNECTION

CROSS REFERENCE TO RELATED APPLICATIONS

This application claims priority from French application Ser. No. 09/02113, filed Apr. 30, 2009, which is hereby incorporated herein in its entirety by reference.

FIELD AND BACKGROUND OF THE INVENTION

The present invention relates to a snap-on coupling for connecting a low-pressure fluid pipe to a rigid tubular end fitting, particularly for a fuel supply line or for a brake power line for a vehicle driven by a heat engine. More specifically, the invention relates to such a coupling fitted with a visual indicator for showing correct connection between this end fitting and a sleeve of this coupling into which this pipe is inserted, as well as to a method of visually inspecting this connection.

A snap-on coupling for connecting a fluid pipe to a rigid tubular end fitting is described for example in FR-A1-2 795 156 in the present Applicant's name. That coupling comprises among other things a sleeve mounted in a fixed position on one end of the pipe, and the rigid tubular end fitting, designed to be inserted into the sleeve, has a peripheral projection toward its free end. The coupling is completed by a locking member in the form of a staple or U designed to straddle the sleeve and having two elastically deformable legs capable of engaging in two openings in the sleeve in order to engage with the peripheral projection on the end fitting and thus retain the latter in the sleeve. To facilitate the connection, the locking member is pre-mounted onto the sleeve, and the tubular end fitting is then engaged in the sleeve. This engagement causes the two elastic legs of the locking member to move apart as the peripheral projection of the end fitting passes between them, and the two elastic legs should return to their initial positions after the projection has passed between them in order to retain the end fitting in the sleeve.

The operator making the connection can be confident that the connection is correctly made when the two elastic legs return to their initial positions after the peripheral projection on the end fitting has passed between them, because this produces a characteristic noise which the operator can hear. However, this audible indicator of a correct connection may not be heard by an operator working in a hostile environment with background noise.

Document EP-B1-1 770 321 in the present Applicant's name has a coupling of the type described in that document FR-A1-2 795 156, but which is also fitted with a visual indicator for ensuring correct connection between the end fitting and the coupling without the need for a quiet environment when the coupling is being connected. This indicator, which also consists of a U or staple with one head and two deformable legs, is supported by the sleeve behind the locking member and is designed to engage with the projection on the end fitting so as to move from a depressed position within the sleeve to an extended position out of the sleeve and so provide a visual indication that the end fitting is correctly connected in the sleeve, since the legs of the indicator have inward fixing catches at their free ends which engage with two lower teeth formed on the sleeve when the indicator is in the depressed position and with two intermediate teeth formed on the sleeve when the indicator is in the extended position.

SUMMARY OF THE INVENTION

One object of the present invention is to provide a novel snap-on coupling allowing not only visual inspection of correct connection of the end fitting in the sleeve, as indicated in document EP-B1-1 770 321, but also to double-lock this connection in addition to the locking member. This coupling comprises:
  a sleeve mounted on one end of a pipe to be connected to a rigid tubular end fitting, which is intended to be inserted into the sleeve and has a peripheral connecting projection,
  a locking member intended to engage with this projection to retain the end fitting in the sleeve, and
  a visual indicator which is intended to engage with this projection to indicate that the end fitting is correctly connected in the sleeve and which is supported by the latter and positioned axially behind the locking member in the direction of insertion of the end fitting into the sleeve, the indicator being capable of occupying a plurality of fitted positions including an extended position in which it projects radially from the sleeve and a depressed position in which it is retracted in it, the locking member and the indicator each comprising a U or staple with a head and two elastically deformable side legs, each leg of the indicator having a retention arm which continues each leg radially inward and which engages with a lower side tooth and with a bottom stop, both of the latter being formed on the corresponding side of the sleeve, when the indicator occupies the depressed position and the extended position, respectively.

For this purpose, this coupling is such that the indicator is able to:
  be retained in the extended position before the connection is made, on the one hand by being prevented from occupying the depressed position by said retention arms which bear on said bottom stops and on the other hand by resisting its complete extraction from the sleeve by locking means formed on the legs which bear on the underside of top stops of this sleeve,
  be released from the extended position by the making of this connection, which spreads these two arms away from each other on contact with the projection, enabling the indicator to occupy the depressed position, and then
  be moved from the extended position to the depressed position by radial pressure on its head and be kept in this position by the locking of its retention arms underneath the lower teeth, so that the indicator in the depressed position indicates correct connection and double-locks the connection by retaining the end fitting in addition to the locking member.

It will be observed that the indicator cannot be released from its extended position out of the sleeve unless the end fitting is correctly connected to the sleeve by means of its projection. In other words, the indicator is locked in the extended position before the connection, but cannot be extracted from the sleeve because of said locking means, and cannot be depressed down into it because of said retention arms.

In accordance with another feature of the invention, the locking member and the indicator are axially adjacent inside the sleeve in such a way that their respective heads are diametrically opposite each other.

In a first embodiment of the invention, this coupling is able to unlock the connection by radial pressure applied simultaneously onto these heads in such a way as to spread the corresponding legs and so allow the end fitting to be withdrawn from the sleeve. The indicator can thus be designed to indicate, when the end fitting is first connected to the sleeve, correct connection by its depressed position, this indicator on subsequent occasions merely double-locking the connection in addition to the locking member.

In a second embodiment of the invention, the indicator is designed to indicate correct connection by its depressed position, not only when the end fitting is first connected to the sleeve but on subsequent connections, the indicator being able to be moved back from its depressed position to its extended position by applying upward pressure simultaneously to the underside of two lower pushers forming respective projections radially outward of the junction between said legs and their retention arms, to allow the end fitting to be withdrawn from the sleeve. The indicator in this second embodiment thus constitutes a "resettable" variant of the indicator of the first embodiment.

Advantageously, in this second embodiment of the invention, said two side legs of the locking member may each have a stop for the indicator, against which said corresponding lower pushers are intended to bear when the indicator is raised again to the extended position, so that these stops retain this indicator on the coupling. In this case, these stops on the indicator embrace from the side said side legs of the indicator between its depressed and extended positions, with the exception of its lower pushers which are retained under these catches in the extended position.

In accordance with another feature of the invention, the means for locking the indicator in the extended position, which resists its withdrawal from the sleeve when a radially outward force is applied to its head, may comprise:
  two radial protuberances, each situated in a lower part of the corresponding leg which is adjacent to the retention arm on its end and which bear in the extended position directly to the underside of two intermediate teeth of the sleeve, and
  two axial protuberances projecting toward the rear from the indicator which are each situated in an upper part of the corresponding leg adjacent to the head and which are held in the extended position directly underneath two upper shoulders of the sleeve,
these intermediate teeth and upper shoulders forming said top stops of the sleeve.

In accordance with another feature of the invention, each retention arm may be formed by a horizontal straight arm forming approximately a right angle with the adjacent lower end of the corresponding side leg.

Advantageously, each of the radial protuberances may be formed on the inward face of the right-angled junction between this lower end of the leg and said retention arm at the end of the latter, each radial protuberance forming preferably approximately a right-angled trapezoid whose long base parallel to this retention arm bears on the underside of said intermediate tooth of the sleeve.

Also advantageously, each of the axial protuberances may be formed by a preferably approximately parallelepiped block which bears on the underside of the upper shoulder of the sleeve.

In accordance with another feature of the invention, each of the side legs of the indicator may advantageously comprise an oblique upper part forming an obtuse angle with said head, a vertical lower part ending at a right angle with said retention arm, and a middle part connecting the upper part to the lower part and continuing radially inward to form a lug with a chamfered bearing surface designed to retain the end fitting in the depressed position and forming the double lock, the indicator having its two upper parts diverging from each other away from its head and its two middle parts converging toward each other in the form of these lugs.

A method according to the invention of visually inspecting the connection between an end fitting and a sleeve of a snap-on coupling as defined above comprises the following steps:
  a) before the connection is made between the end fitting on the inside and the sleeve on the outside, the indicator is retained in the extended position by bearing against this sleeve,
  b) once this connection has been made, with the projection of the end fitting locked axially by and behind the locking member, said legs of the indicator are spread apart by the contact of the projection so that the indicator is released from this extended position, and then
  c) radial pressure is applied by hand to said head of the indicator to move it from this extended position to the depressed position, in which it is kept by its retention arms being locked underneath said lower teeth, such that the indicator acts in this depressed position as a visual indicator of correct connection and also double-locks the connection by retaining the end fitting in addition to the locking member.

In accordance with another feature of the invention relating to the first embodiment indicated above, this inspection method is such that:
  before step a), the locking member and the indicator are mounted axially adjacent to each other inside the sleeve in such a way that their respective heads are diametrically opposite each other, and that
  after step c), the resulting connection is unlocked by applying radial pressure simultaneously to these heads in such a way as to spread the corresponding legs and thus allow the end fitting to be withdrawn from the sleeve.

It will be observed that this releasing of the connection can be easily brought about in a single manual action by the operator by pressing as described above at these two diametrically opposite locations on the sleeve.

Referring to the second embodiment indicated above in accordance with the invention, this inspection method is such that:
  before step a), the locking member and the indicator are mounted axially adjacent to each other inside the sleeve in such a way that their respective heads are diametrically opposite each other, and that
  after step c), the resulting connection is unlocked by applying upward radial pressure to the head of the locking member and to the two lower pushers forming projections radially external to the junction between the legs of the indicator and their retention arms, in such a way as to spread the legs and thus allow the end fitting to be withdrawn from the sleeve.

It will be seen that with this second embodiment or "resettable" variant of the indicator according to the invention, the return of this indicator to the extended position is necessary to allow the end fitting to be disconnected from the sleeve.

BRIEF DESCRIPTION OF THE DRAWINGS

Other features, advantages and details of the present invention will become clear in the course of reading the following description of certain examples of the invention, offered by way of illustration, without implying any limitation. This description refers to the appended drawings, in which.

MORE DETAILED DESCRIPTION

Figure 1:
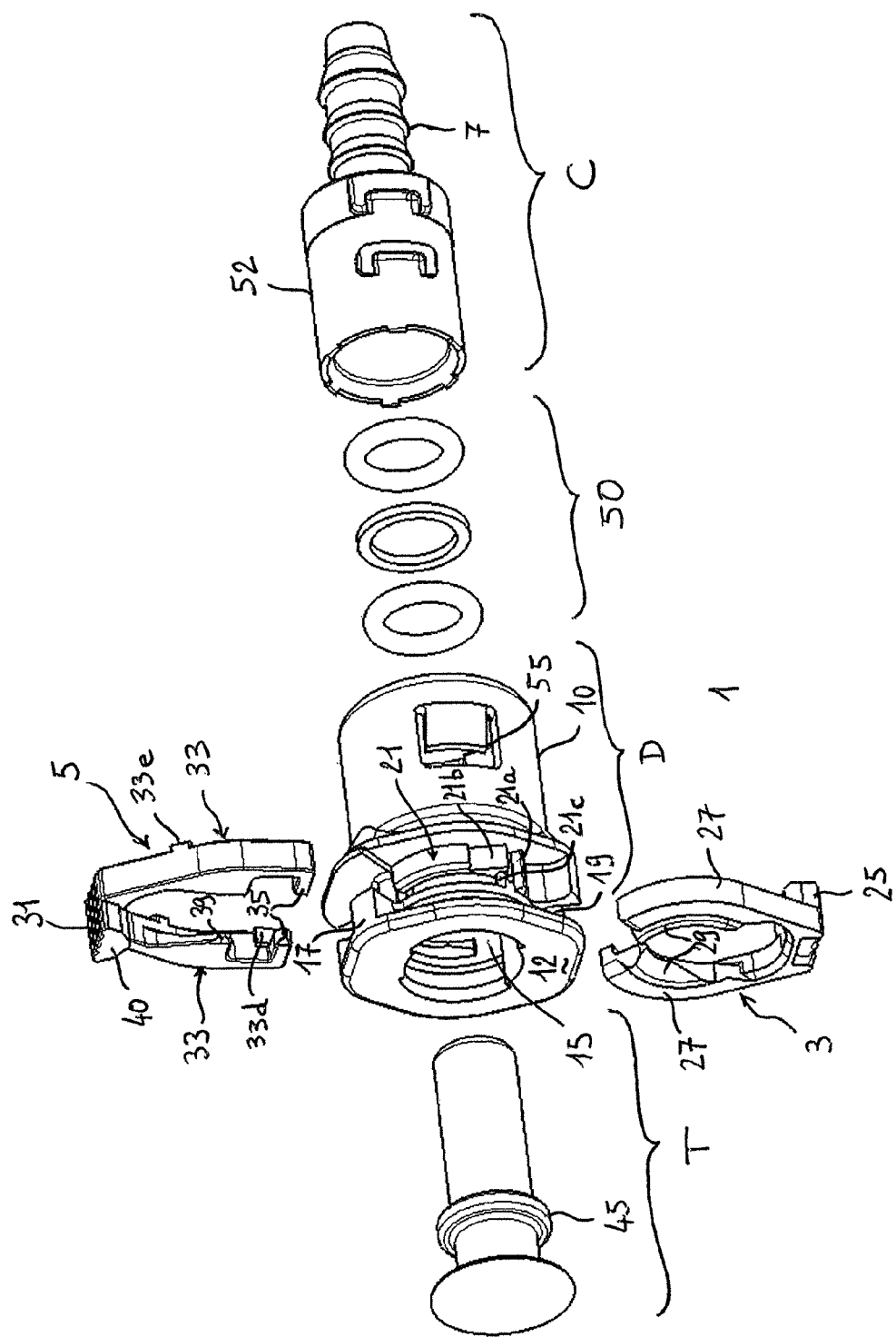
FIG. 1 is an exploded perspective view of an end fitting for insertion into a snap-on coupling according to the invention provided with a pipe for fitting into this coupling.

The snap-on coupling 1 as illustrated in FIG. 1 between a fluid pipe C and a tubular end fitting T comprises a body in the shape of a sleeve D mounted in a fixed manner via a retention device on one end of the pipe C, a locking member 3 for the end fitting T in the sleeve D, and a visual indicator 5 of correct connection between the end fitting T and the sleeve D. The pipe C is usually flexible and is connected leaktightly by forcing its end onto a fir-tree end 7 for example which continues one end of the sleeve D, this fir-tree end constituting the aforementioned retention device. The end fitting T possesses toward its free end a peripheral connection projection or collar 45 which, when the end fitting T is inserted into the sleeve D, engages first with the locking member 3 and then with the indicator 5.

The coupling 1 also includes means for creating a seal between the end fitting T and the pipe C. These sealing means may be annular gaskets 50 for example mounted or overmolded onto one end of a connecting jacket 52 which snaps inside two diametrically opposite orifices 55 formed in a cylindrical central part 10 of the sleeve D.

The sleeve D has, in addition to the central part 10, an end part 12 opposite the end connected to the pipe C and separated from this central part 10 by two opposite openings 15 (only one opening 15 can be seen in FIG. 1) which define between themselves two bridges 17 and 19 connecting the central part 10 and the end part 12. Next to the central part 10, the bridges 17 and 19 are connected to each other by two lateral arcs of material 21, the outer wall of each of which has a lower stop tooth 21a, an intermediate stop tooth 21b, a bottom stop 21c and an upper shoulder 21d which are all designed to engage with the indicator 5, as will be explained later.

The locking member 3 is in the form of a U or staple with a head 25 and two opposing elastically deformable curved legs 27. On its front face, from a point of the direction of engagement of the end fitting T in the sleeve D, each elastically deformable leg 27 of the locking member 3 has a thin region or depression forming a first inclined bearing surface 29.

Figure 7:
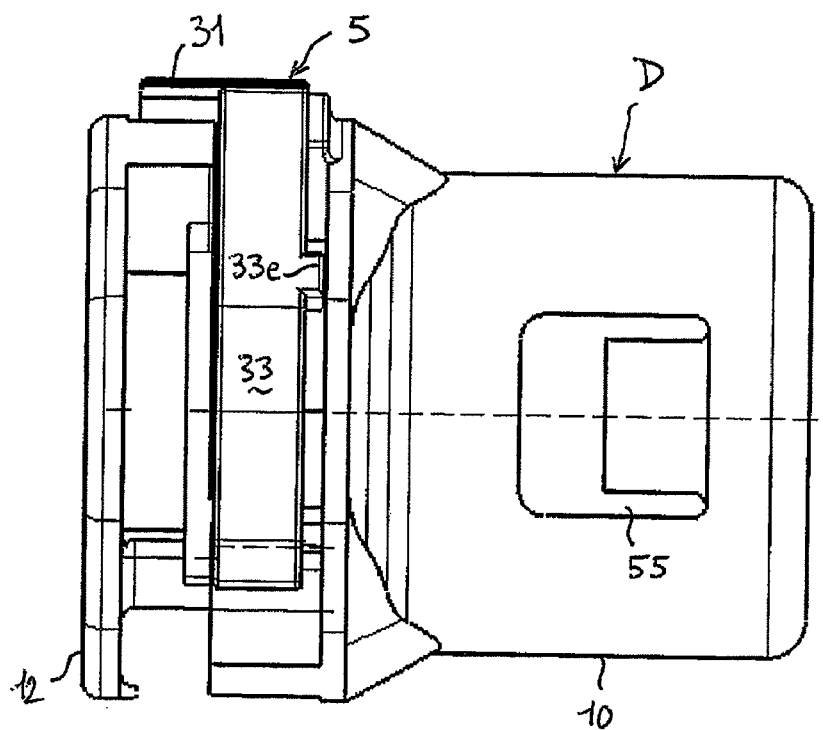
FIG. 7 is a side view similar to FIG. 2 showing the coupling of the invention but incorporating the indicator in the depressed position.
Figure 8:
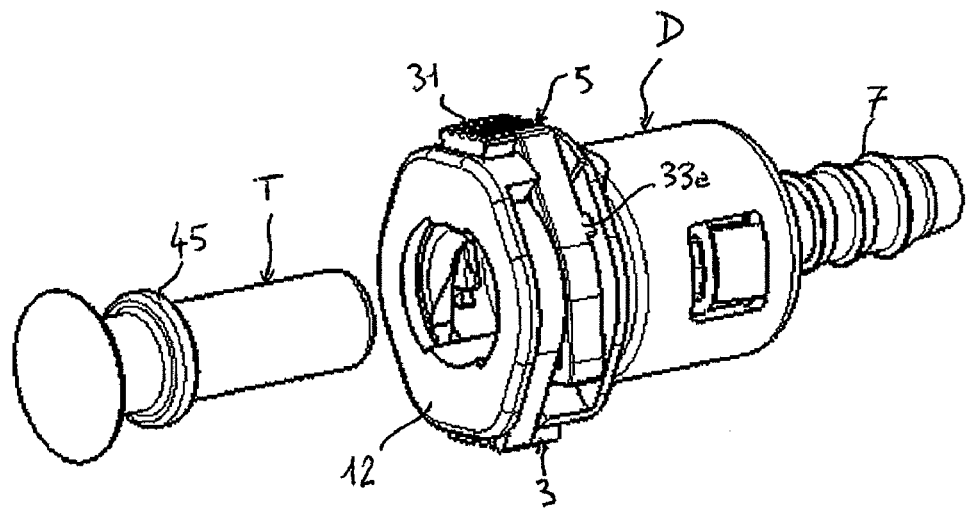
FIG. 8 is an exploded perspective view showing the coupling seen in FIG. 7 in this depressed position of the indicator, but accompanied by the locking member, the end fitting and the pipe to be coupled.
Figure 9:
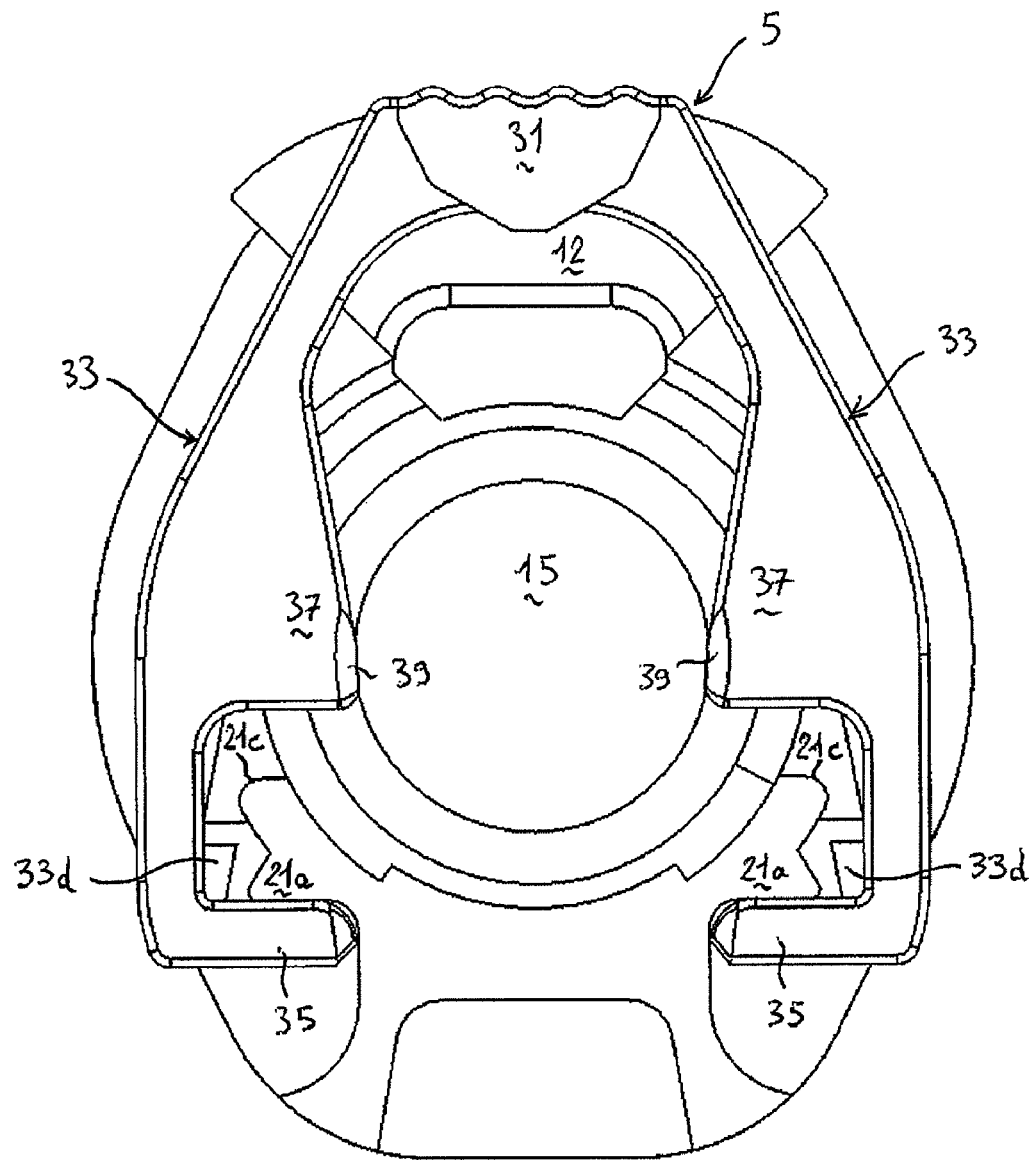
FIG. 9 is an end view of the rear of the coupling according to the invention similar to FIG. 5, but showing the indicator in this depressed position.

The indicator 5 is also in the form of a U or staple with a head 31 and two elastically deformable opposite curved legs 33, each ending in an inward retention arm 35 designed to bear against each bottom stop 21c in the extended position shown in FIGS. 2-5 (i.e. the top position in which the indicator 5 is delivered, projecting radially out of the sleeve D) and each lower tooth 21a in the depressed position shown in FIGS. 7-9 (i.e. a bottom position, depressed into the sleeve in a similar way to the locking member 3). In the middle of each leg 33 is an inward lug 37 with a thin region or depression forming a second chamfered bearing surface 39 (see FIG. 5).

Figure 5:
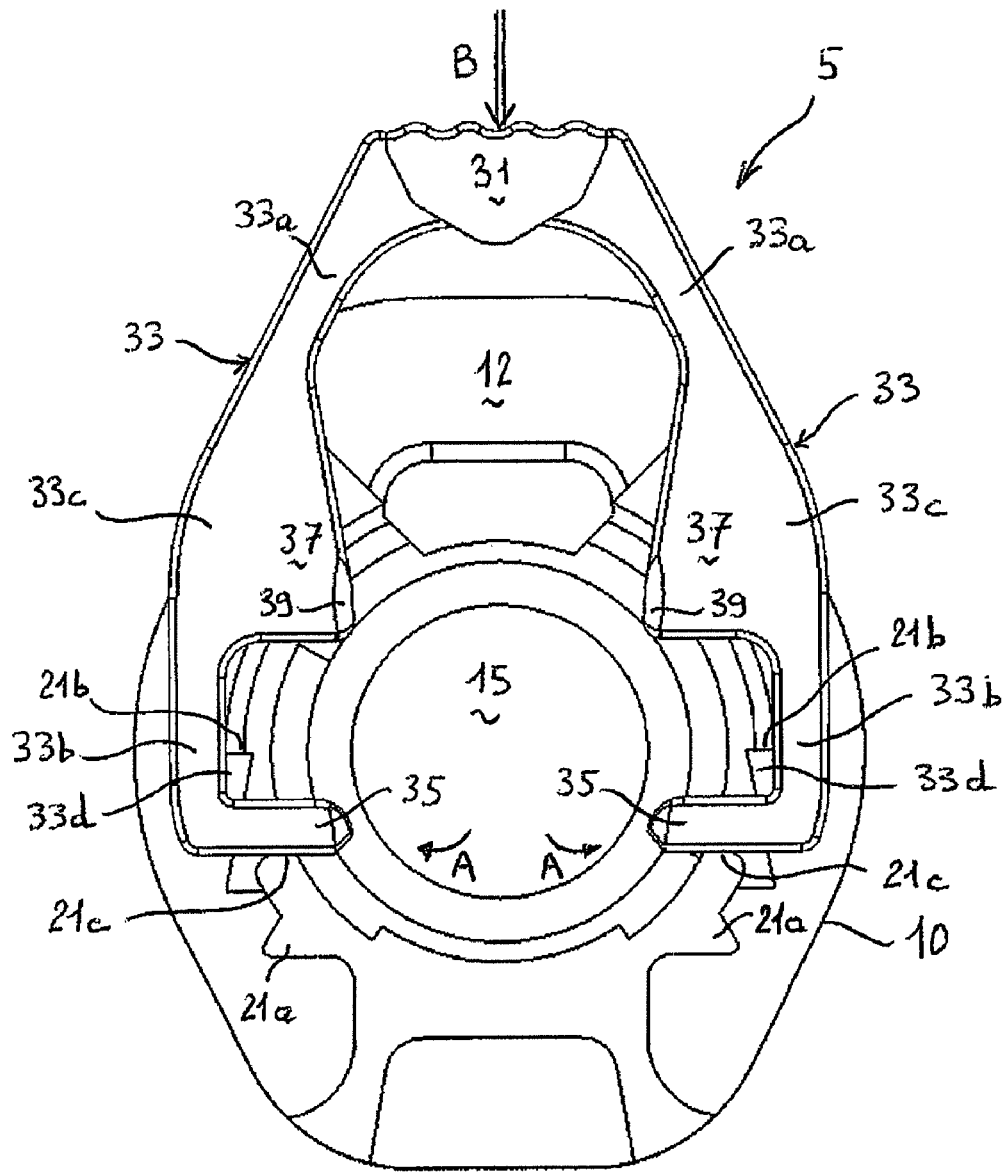
FIG. 5 is an end view of the rear of the coupling seen in FIG. 4 in this same extended position of the indicator.

As illustrated in more detail in FIG. 5, the two legs 33 of the indicator 5 each have an oblique upper part 33a forming an obtuse angle with the head 31 and diverging away from it, two vertical lower parts 33b ending at right angles in the straight horizontal retention arms 35 and two middle parts 33c connecting the parts 33a and 33b to each other and extending radially inward to form the lugs 37 which converge toward each other and are designed to retain the end fitting T in the depressed position of the indicator 5.

The locking member 3 and the indicator 5 are brought together and pre-assembled around the bridges 17 and 19 so that the indicator 5 is axially behind the locking member 3 from the point of view of the direction of insertion of the end fitting T into the sleeve D, and their respective heads 25 and 31 are diametrically opposite each other. The two legs 27 of the locking member 3 engage freely in the two openings 15 of the sleeve D, while the two retention arms 35 of the legs 33 of the indicator 5 bear on the two bottom stops 21c of the sleeve D in the initial extended position of this indicator 5. To facilitate the relative positioning of the locking member 3 and indicator 5, the head 31 of the indicator 5 may have an overhanging part 40 projecting from its front face.

Figure 2:
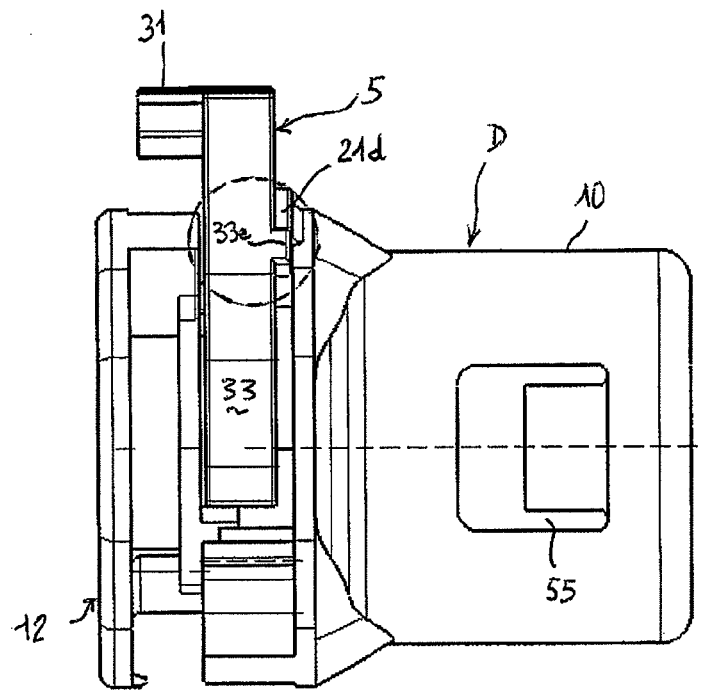
FIG. 2 is a side view of the coupling seen in FIG. 1 incorporating the visual indicator of the invention in the extended position, this coupling being shown without the connection locking member, the end fitting and the pipe to be coupled.
Figure 3:
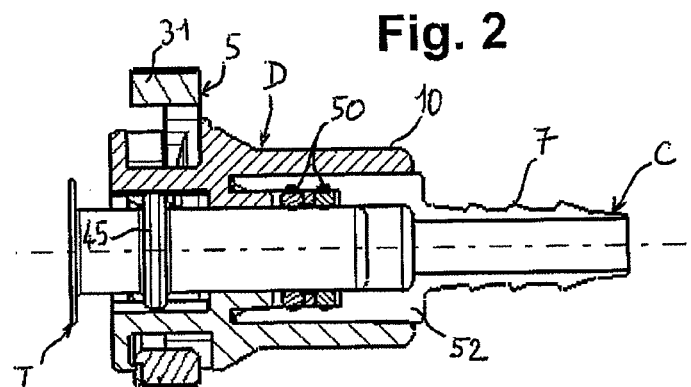
FIG. 3 is an axial section on the plan marked in FIG. 4 through the coupling seen in FIG. 2 with, in addition, the locking member, the end fitting and the pipe to be coupled, in the extended position of the indicator.
Figure 6:
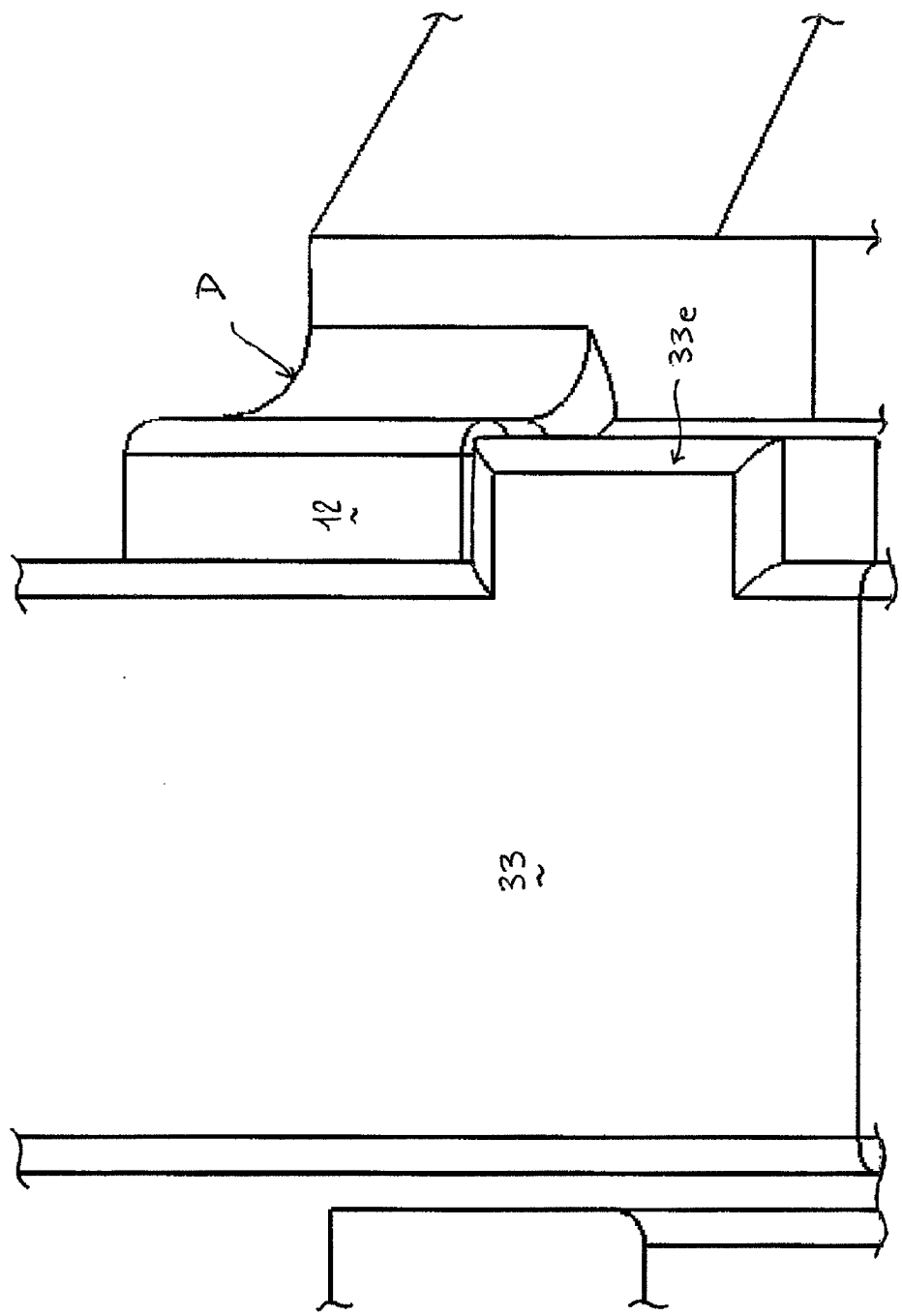
FIG. 6 is a perspective view of the detail circled in dashes in FIG. 2, showing the engagement with a shoulder of the sleeve of an axial protuberance of the indicator keeping it in its extended position.

According to the invention, and as seen in FIGS. 2, 5 and 6, the indicator 5 has means 33d and 33e for locking it in its extended position, in which it is delivered, away from the sleeve D (i.e. before the end fitting T is connected), which comprise:

two radial protuberances 33d in the shape of right-angled trapezoids (symmetrical with each other about the head 31, see FIG. 5) which are situated on the inward faces of the lower parts 33b of the legs 33 at their right-angled junction with the retention arms 35 and which bear via their long bases parallel to these arms 35 directly under two ridges forming the intermediate teeth 21b of the sleeve D, and two axial protuberances 33e in the shape of parallelepiped tabs (symmetrical with each other relative to the head 31, see FIGS. 2 and 6) projecting rearward from the two legs 33 situated in the upper parts 33a of the legs and fitting underneath two upper shoulders 21d on the sleeve D in the extended position.

These two pairs of protuberances 33d and 33e therefore resist the extraction of the indicator 5, in its extended position, from the sleeve D if its head 31 is pulled radially upward. The function of the retention arms 35 in this extended position is to resist downward movement of the indicator 5 to the depressed position (i.e. the retracted or bottom position) within the sleeve D, because they are then bearing against the bottom stops 21c of the sleeve D.

When the end fitting T is inserted into the sleeve D, the projection 45 on the end fitting T will initially bear against the inclined surfaces 29 of the legs 27 of the locking member 3, which legs 27 will widen out and come out of the openings 15 of the sleeve D, thus letting the end fitting T through. Next, since the projection 45 is no longer in contact with these bearing surfaces 29, the legs 27 spring back to their initial position. Next, this projection 45 will bear against the chamfers on the ends of the arms 35, pushing them apart (shown by the arrows A in FIG. 5) so that they come free of the two bottom stops 21c of the sleeve D, releasing the indicator 5 from its initial extended position so that it can be retracted into the sleeve D in the depressed position. It will be seen that the releasing of the indicator 5 from the extended position cannot be done manually: only this engagement of the end fitting T with the legs 33 is capable of releasing the indicator 5 from this extended position.

The indicator 5 is retracted by applying hand pressure (in the direction of arrow B in FIG. 5) to the head 31 of the indicator 5, which enables it to establish a double lock on the end fitting T in the sleeve D complementary to that of the locking member 3 and in the same manner as the latter. The indicator 5 is now locked in the sleeve D by its retention arms 35 which engage underneath the lower teeth 21a (see FIG. 9). Moreover, the lugs 37 enhance this double lock by retaining the end fitting T.

The operator who has installed the coupling can therefore see visually that the connection is properly made, simply because the indicator 5 is now in this depressed position.

To release this connection, the operator applies hand pressure simultaneously on the heads 25 and 31 of the locking member 3 and indicator 5, respectively, in such a way as to open the corresponding legs 27 and 33 in a single operation and thus allow the end fitting T to be withdrawn from the sleeve D.

It will be seen that the indicator 5 thus indicates, when the end fitting T is first connected to the sleeve D, that the connection is correct by its depressed position and simultaneously double-locks this end fitting T in the sleeve D, and it will also be seen that the indicator 5 only performs this double lock during subsequent connections.

It will further be seen that if the locking member 3 or the indicator 5 of the coupling 1 according to the invention fails, one or the other is still sufficient to lock/unlock the connection.

As shown in FIGS. 10-13, it is also possible to use a "resettable" variant of this indicator 5 according to the invention, in which the indicator 5' of the coupling 1' can be pulled back to the extended position to allow the end fitting T to be disconnected from the sleeve D (the latter, and the locking member 3, being unchanged in this variant from FIGS. 1-9).

The indicator 5' can be drawn back to its initial extended position out of the end fitting T following double-locking of the connection, and is therefore able to indicate correct connection by its depressed position not only during the first connection of the end fitting T to the sleeve D but also during subsequent connections. For this purpose, this indicator 5' is differentiated from the indicator 5 only in that it can be moved back from its depressed position to its extended position by an upward pressure applied simultaneously to the undersides of two lower pushers 35a (see arrows C in FIG. 13 for this upward push on two corresponding lower regions Z1 of the indicator 5') forming two respective projections radially outward of the junction of the legs 33' and of their retention arms 35', to allow the end fitting T to be pulled out of the sleeve D.

Figure 11:
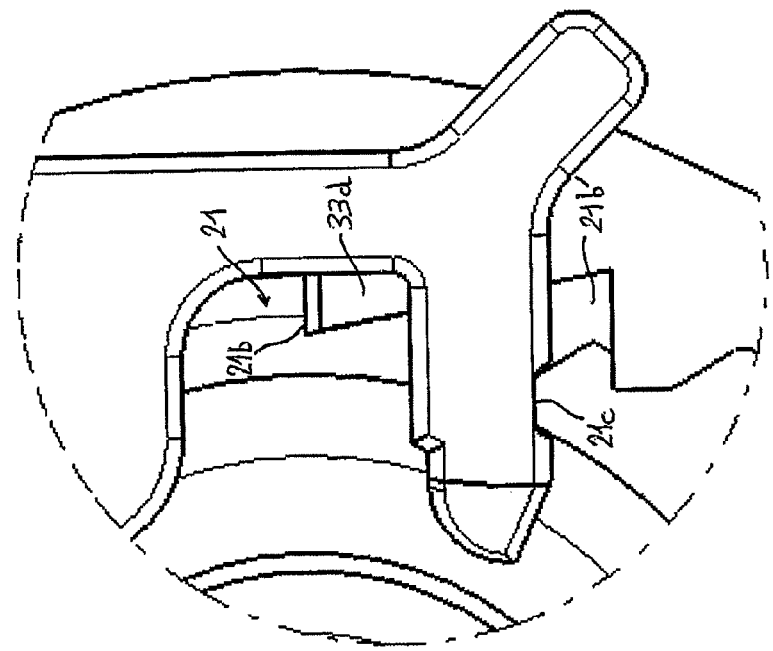
FIG. 11 is a detailed view of the coupling seen in FIG. 10 showing a leg on the indicator assembled fully home on the sleeve in this extended position.
Figure 10:
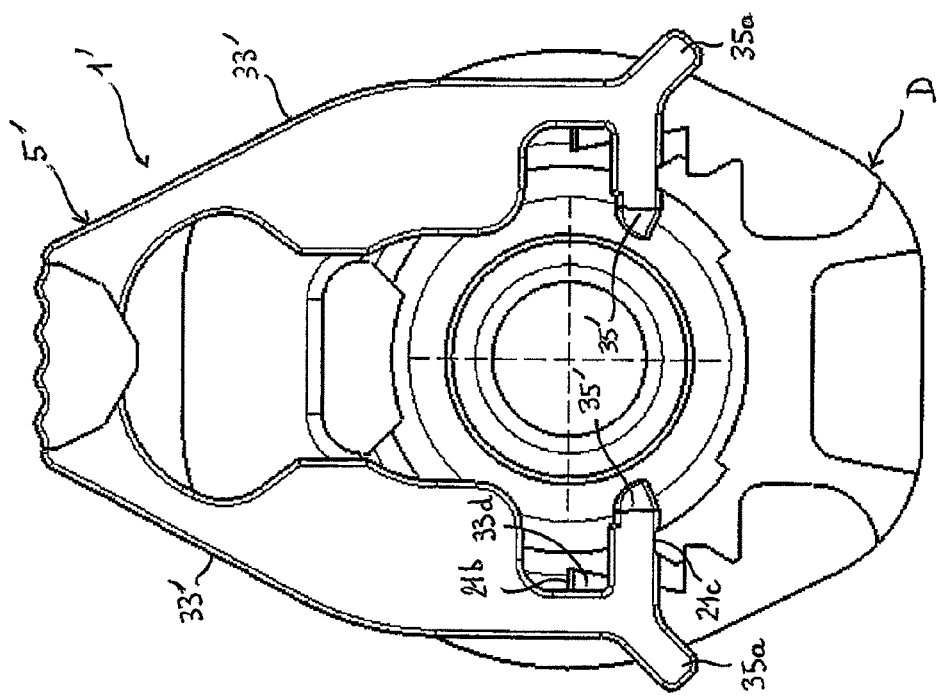
FIG. 10 is an end view of the rear of a coupling in a variant of FIG. 5, with the corresponding indicator in an extended position, this variant showing the second embodiment of the invention.
Figure 12:
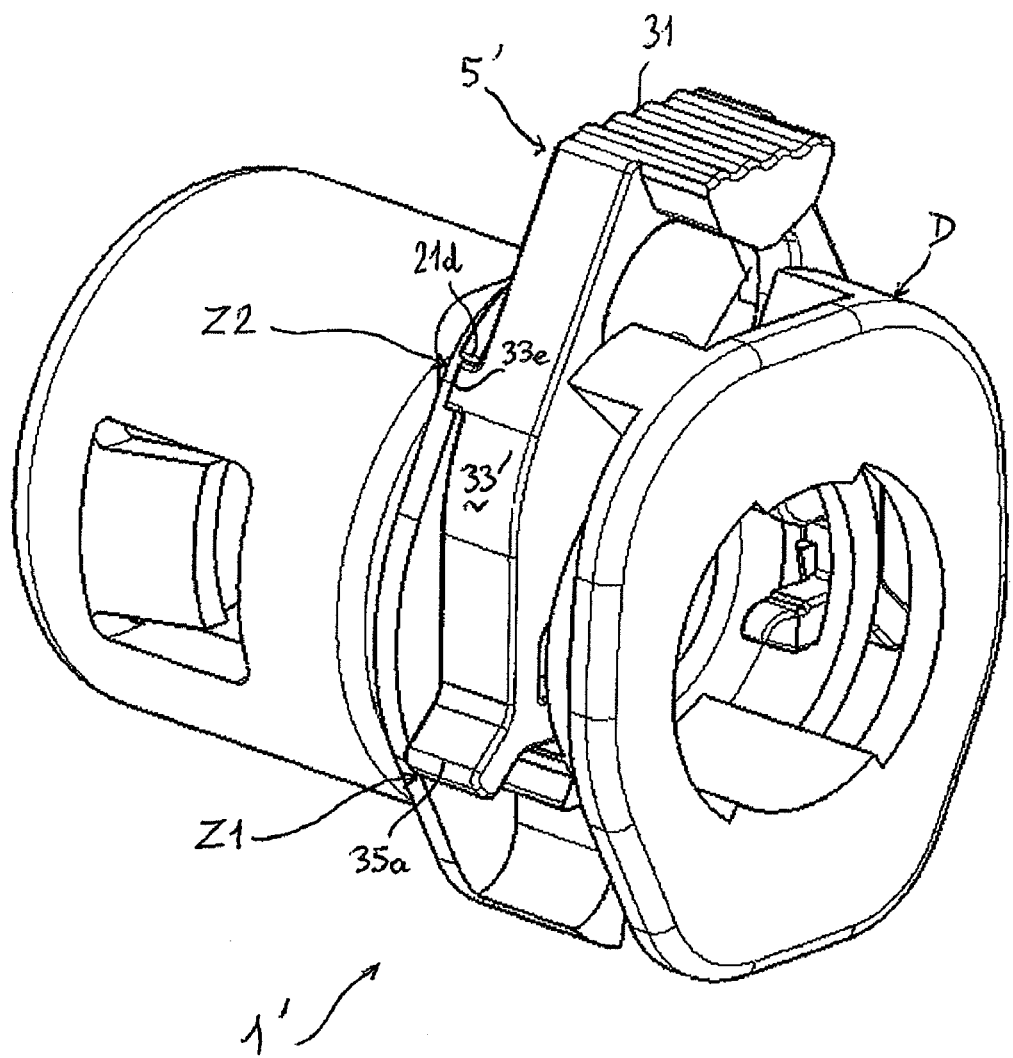
FIG. 12 is a perspective view of the coupling as seen in FIG. 10 (except for the locking member) where the indicator is illustrated in this same extended position on the sleeve.

It can be seen in FIGS. 10 and 11 in particular that each pusher 35a forms an angle of about 45° with the corresponding leg 33' and corresponding arm 35', which arm 35' bears in the extended position on the bottom stop 21c. FIG. 11 also shows each radial protuberance 33d in the fitted position where it bears on the underside of the ridge 21b of the intermediate tooth (the rest of this tooth is denoted by the reference 21b' in FIG. 11) and, in FIG. 12, that of each axial protuberance 33e under the shoulder 21d (the region Z2 illustrates this top contact of each protuberance 33e). These two contact positions prevent the indicator 5' from being pulled up out of the sleeve D, just as with the indicator 5 in FIGS. 1-9.

Figure 13:
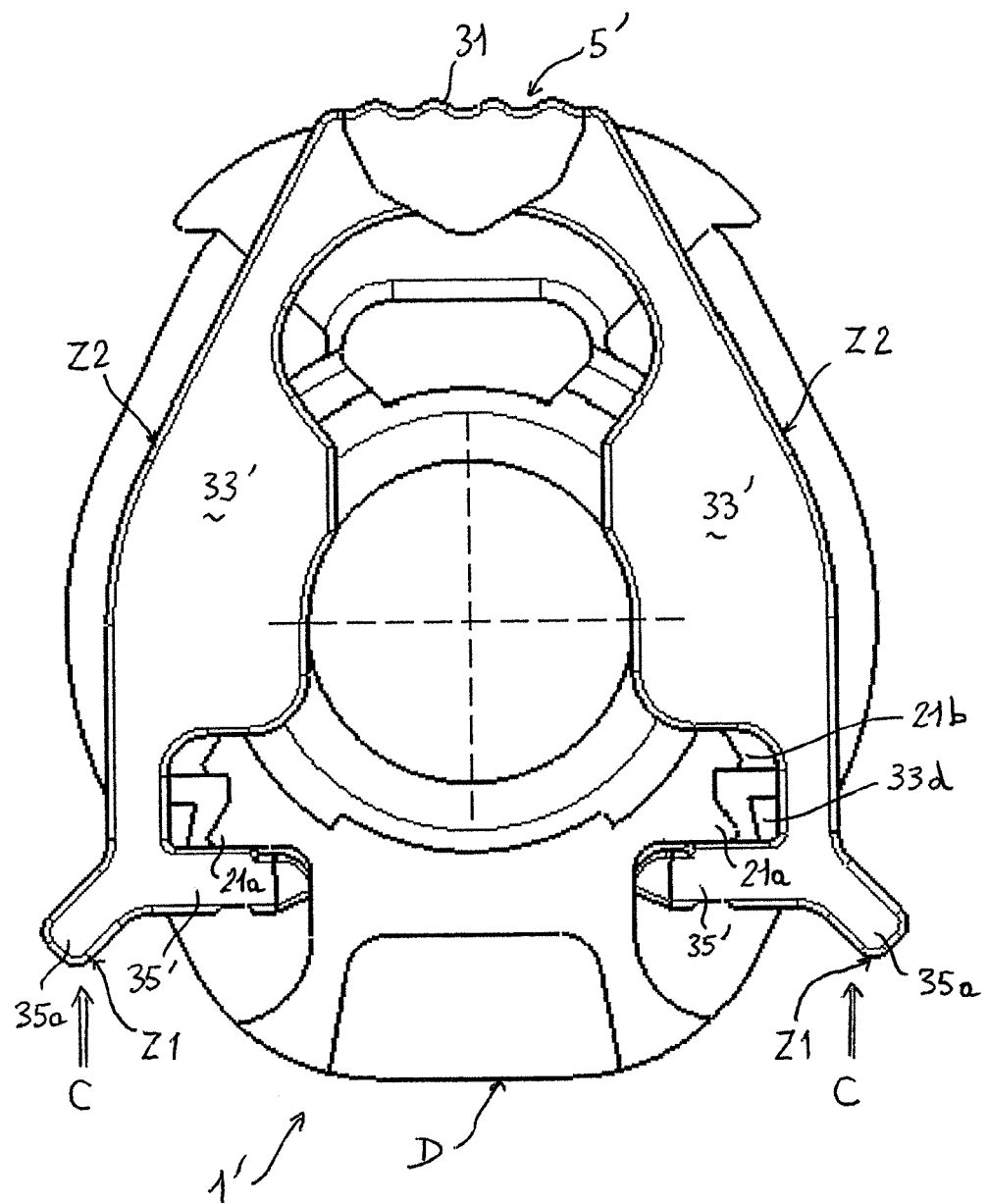
FIG. 13 is an end view of the rear of the same coupling as in FIG. 10 shown in a depressed position in the sleeve.

In the depressed position shown in FIG. 13, which is obtained, in the same way as was described with reference to FIG. 5, by a mutual spreading of the retention arms 35' on contact with the projection 45 so that they disengage from the bottom stops 21c, followed by hand pressure being applied downward on the head 31 of the indicator 5', it can be seen that these arms 35' lock underneath the lower teeth 21a to lock the indicator 5' in the depressed position, in a similar way to the indicator 5 in FIGS. 1-9. Later, upward manual pressure in the direction of arrows C on the head 25 of the locking member 3 and on the two pushers 35a returns the indicator 5' to its initial extended position, a necessary condition for the end fitting T to be able to be disconnected from the sleeve D. More precisely, the indicator 5' is first raised via its pushers 35a, and the member 3 is then opened by pressing radially on its head 25.

Figure 14:
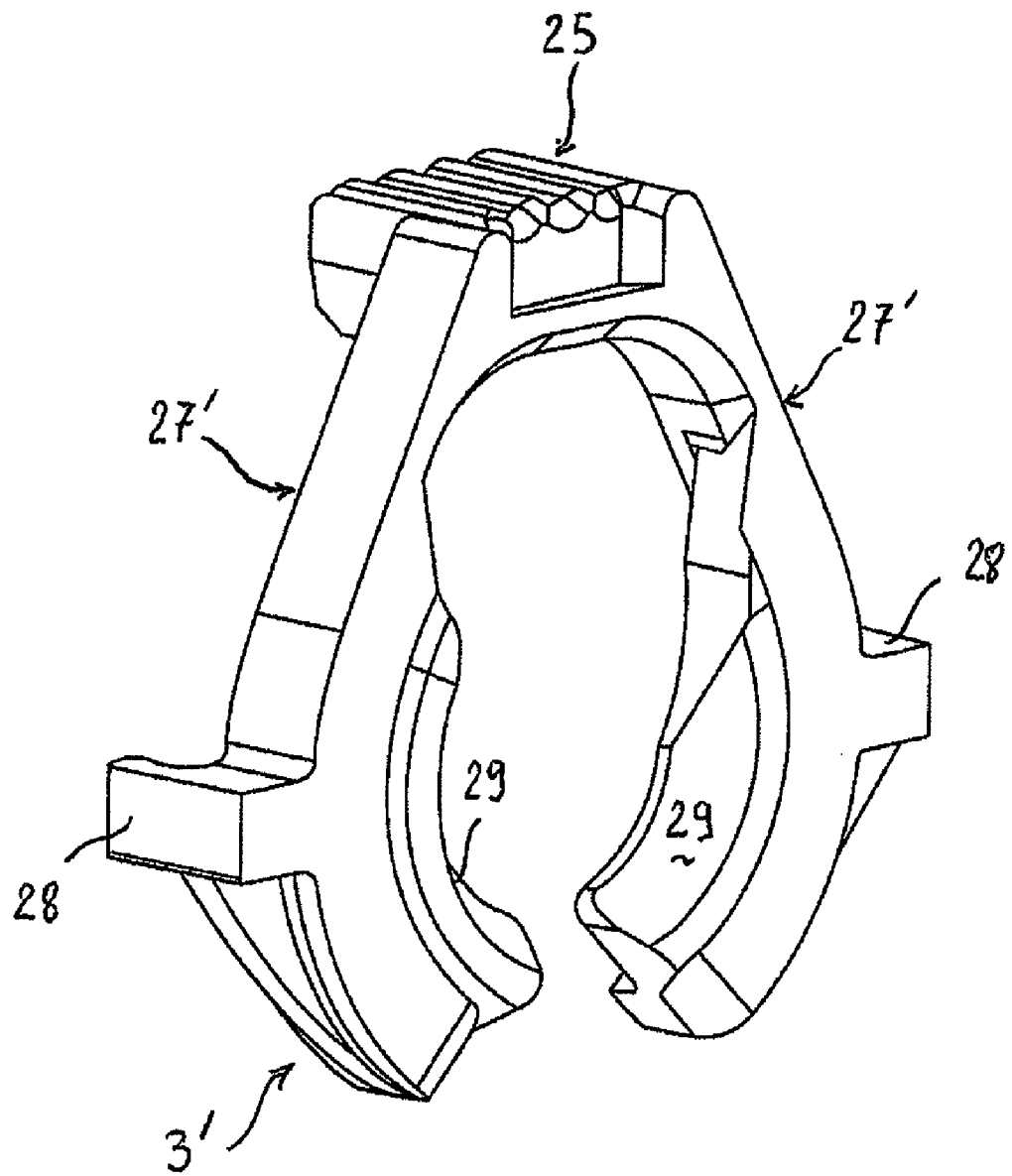
FIG. 14 is a rear perspective view of a locking member usable in a snap-on coupling according to the invention, in a variant of the locking member seen in FIGS. 1-4.
Figure 15:
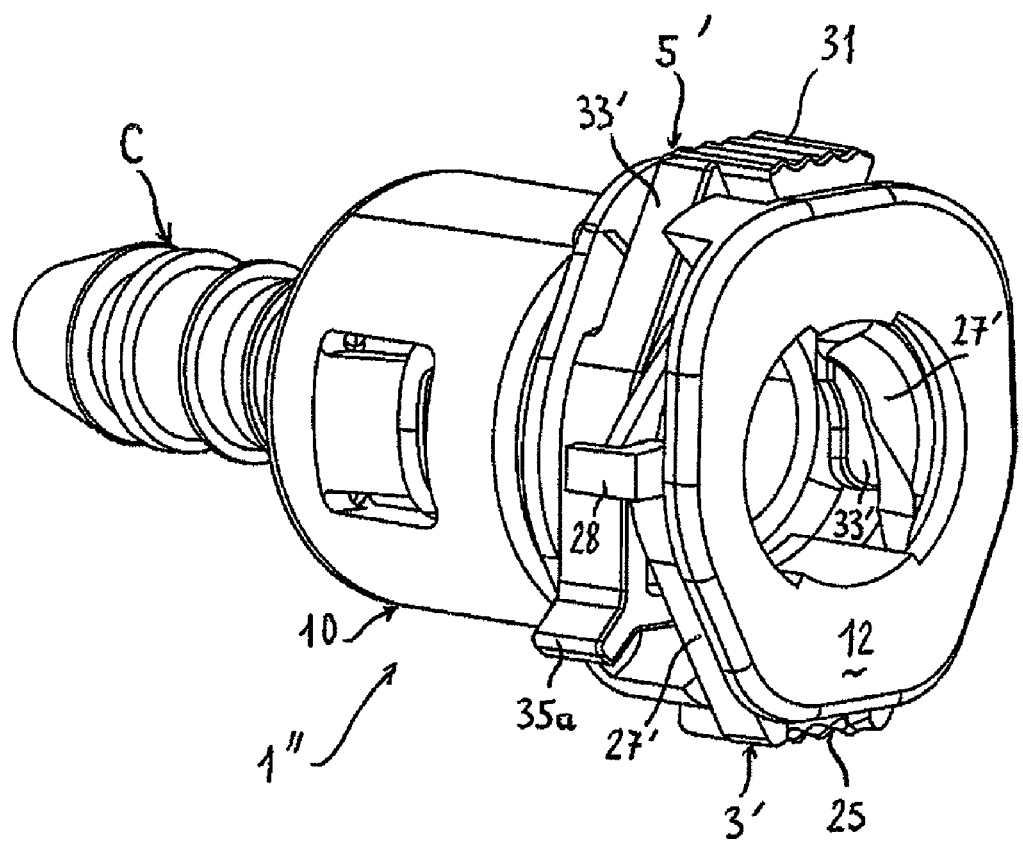
FIG. 15 is an assembled perspective view of a snap-on coupling according to the invention incorporating the indicator seen in FIGS. 10-13 in the depressed position of FIG. 13 and the locking member of FIG. 14.
Figure 16:
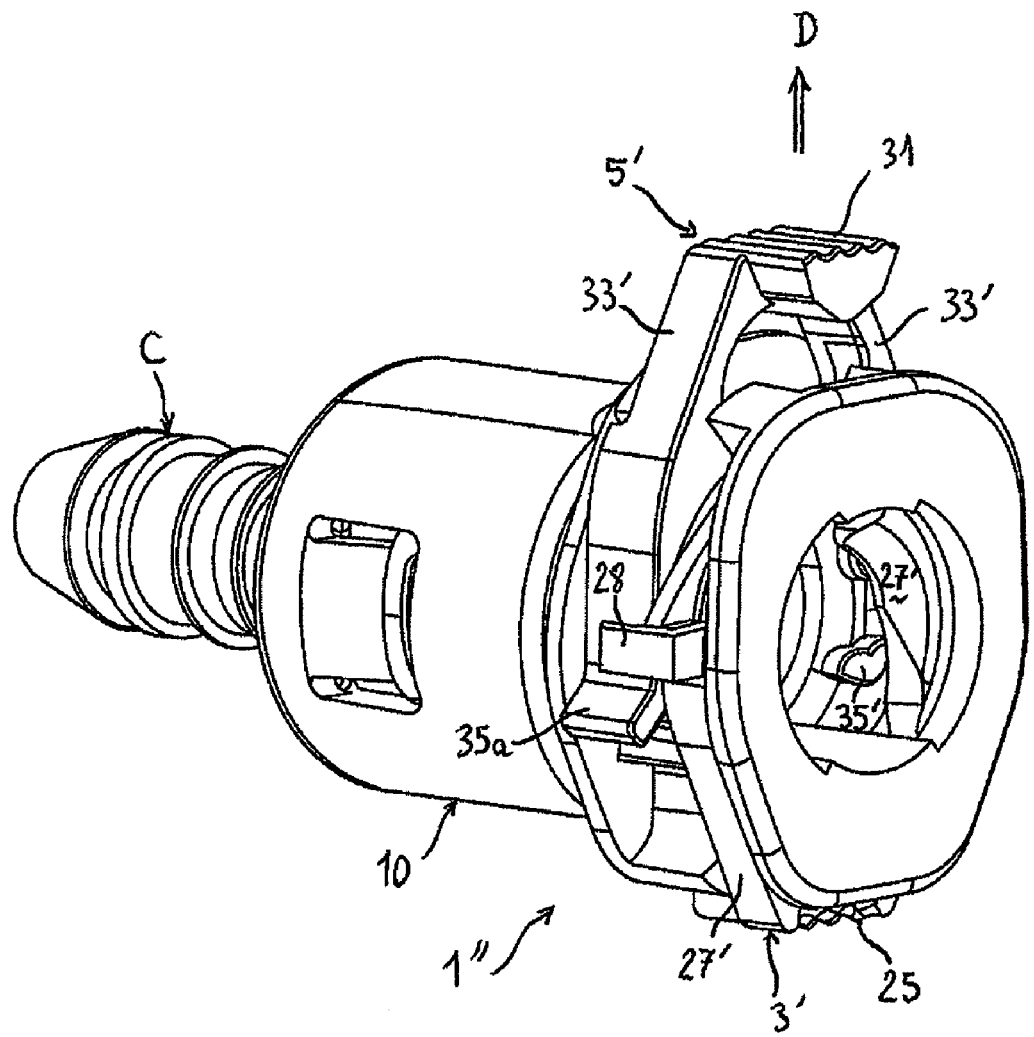
FIG. 16 is an assembled perspective view of the snap-on coupling seen in FIG. 15 in which the indicator is in the extended position as in FIG. 12.

The locking member 3' in the variant shown in FIG. 14 differs from that of FIGS. 1-4 only in that its side legs 27' also each have a stop catch 28 extending in the axial direction and able to embrace on the side the side legs 33' of the indicator 5', the lower pushers 35a of this indicator 5' being designed to bear against these stop catches 28 when the indicator 5' is raised to its extended position (in the direction of arrow D). These catches 28 thus keep the indicator 5' on the coupling 1" so that it cannot be mislaid, the reason being that they resist the total withdrawal of the indicator 5' because its pushers 35a are locked underneath these catches 28. Also, these catches further enhance the effectiveness of the two shoulders 21d and of the two intermediate teeth 21b.

It would be seen that these catches 28 cover the legs 33' of the indicator 5' without interfering with its movements or with its operation, until the pushers 35a are thus brought into top contact.

The invention claimed is:

1. A snap-on coupling comprising:

a sleeve mounted on one end of a pipe to be connected to a rigid tubular end fitting, which is intended to be inserted into the sleeve and has a peripheral connecting projection, a locking member intended to engage with this projection to retain the end fitting in the sleeve, and a visual indicator which is intended to engage with this projection to indicate that the end fitting is correctly connected in the sleeve and which is supported by the latter and positioned axially behind the locking member in the direction of insertion of the end fitting into the sleeve, the indicator being capable of occupying a plurality of fitted positions including an extended position in which it projects radially from the sleeve and a depressed position in which it is retracted in it, the locking member and the indicator each comprising a U or staple with a head and two elastically deformable side legs, each leg of the indicator having a retention arm which continues each leg radially inward and which engages with a lower side tooth and with a bottom stop, both of the latter being formed on the corresponding side of the sleeve, when the indicator occupies the depressed position and the extended position, respectively, the indicator being able to:

be retained in the extended position before the connection is made by being prevented from occupying the depressed position by said retention arms which bear on said bottom stops and by resisting its complete extraction from the sleeve by locking means formed on the legs which bear on the underside of top stops of this sleeve, be released from this extended position by the making of this connection, which spreads the two retention arms away from each other on contact with the projection, enabling the indicator to occupy the depressed position, and then be moved from the extended position to the depressed position by radial pressure on its head and be kept in this position by the locking of the retention arms underneath said lower teeth, so that the indicator in the depressed position indicates correct connection, wherein said side legs of the indicator respectively comprise two middle parts which continue radially inwards by converging toward each other and by forming two lugs configured to retain the end fitting in the depressed position in addition to the locking member, to double-lock the connection.

2. The coupling as claimed in claim 1, wherein the locking member and the indicator are axially adjacent inside the sleeve in such a way that their respective heads are diametrically opposite each other.

3. The coupling as claimed in claim 2, wherein the coupling is able to unlock the connection by radial pressure applied simultaneously onto these heads in such a way as to spread the corresponding legs and so allow the end fitting to be withdrawn from the sleeve.

4. The coupling as claimed in claim 3, wherein the indicator is designed to indicate, when the end fitting is first connected to the sleeve, correct connection by the depressed position of the indicator, this indicator on subsequent occasions merely double-locking the connection in addition to the locking member.

5. The coupling as claimed in claim 2, wherein the indicator is designed to indicate correct connection by the depressed position of the indicator, not only when the end fitting is first connected to the sleeve but on subsequent connections, the indicator being able to be moved back from the depressed position of the indicator to the extended position of the indicator by applying upward pressure simultaneously to the underside of two lower pushers forming respective projections radially outward of the junction between said legs and their retention arms, to allow the end fitting to be withdrawn from the sleeve.

6. The coupling as claimed in claim 5, wherein said two side legs of the locking member each have a stop for the indicator, against which said corresponding lower pushers are intended to bear when this indicator is raised again to the extended position, so that these stops retain this indicator on the coupling.

7. The coupling as claimed in claim 6, wherein said stops on the indicator are formed by catches embracing from the side said side legs of this indicator between its depressed and extended positions, with the exception of said lower pushers which are retained under these catches in the extended position.

8. The coupling as claimed in claim 1, wherein said locking means for locking the indicator in the extended position, which resists a withdrawal of the indicator from the sleeve when a radially outward force is applied to the head of the indicator, comprise:

two radial protuberances, each situated in a lower part of the corresponding leg which is adjacent to the retention arm by which this leg ends and which bear in the extended position directly to the underside of two intermediate teeth of the sleeve, and two axial protuberances projecting toward the rear from the indicator which are each situated in an upper part of the corresponding leg adjacent to the head and which are held in this extended position directly underneath two upper shoulders of the sleeve, these intermediate teeth and upper shoulders forming said top stops of the sleeve.

9. The coupling as claimed in claim 8, wherein each retention arm is formed by a horizontal straight arm forming approximately a right angle with the adjacent lower end of the corresponding side leg, and wherein each radial protuberance is formed on the inward face of the right-angled junction between this lower end of the leg and said retention arm at the end of the latter, forming approximately a right-angled trapezoid whose long base parallel to this retention arm bears on the underside of said intermediate tooth of the sleeve, and each axial protuberance being formed by an approximately parallelepiped block which bears on the underside of said upper shoulder of the sleeve.

10. The coupling as claimed in claim 1, wherein each of said side legs of the indicator comprises:

an oblique upper part forming an obtuse angle with said head, a vertical lower part ending at a right angle with said retention arm, and a middle part connecting this upper part to this lower part and continuing radially inward to form a lug with a chamfered bearing surface designed to retain the end fitting in the depressed position and forming said double lock, the indicator having its two upper parts diverging from each other away from said head and its two middle parts converging toward each other in the form of these lugs.

11. A method for locking a connection between an end fitting and a sleeve of a snap-on coupling and for visually inspecting this connection, the method comprising, providing a coupling having:
- a sleeve mounted on one end of a pipe to be connected to a rigid tubular end fitting, which is intended to be inserted into the sleeve and has a peripheral connection projection,
- a locking member intended to engage with this projection to retain the end fitting in the sleeve, and
- a visual indicator which is intended to engage with this projection to indicate that the end fitting is correctly connected in the sleeve and which is supported by the latter and positioned axially behind the locking member in the direction or insertion of the end fitting into the sleeve, the indicator being capable of occupying a plurality of fitted positions including an extended position in which it projects radially from the sleeve and a depressed position in which it is retracted in it, the locking member and the indicator each comprising a U or staple with a head and two elastically deformable side legs, each leg of the indicator having a retention arm which continues each leg radially inward and which engages with a lower side tooth and with a bottom stop, both of the latter being formed on the corresponding side of the sleeve, when the indicator occupies the depressed position and the extended position, respectively, the indicator being able to:
- be retained in the extended position before the connection is made, by being prevented from occupying the depressed position by said retention arms which bear on said bottom stops and by resisting its complete extraction from the sleeve by locking means formed on the legs which bear on the underside of the top stops of this sleeve,
- be released from this extended position by the making of this connection, which spreads the two retention arms away from each other on contact with the projection, enabling the indicator to occupy the depressed position, and then
- be moved from the extended position to the depressed position by radial pressure on its head and be kept in this position by the locking of the retention arms underneath said lower teeth, so that the indicator in the depressed position indicates correct connection, wherein said side legs of the indicator respectively comprise two middle parts which continue radially inwards by converging toward each other and by forming two lugs configured to retain the end fitting in the depressed position in addition to the locking member, to double-lock the connection, the method further comprising the following stages the locking member and the indicator are mounted axially adjacent to each other inside the sleeve in such a way that their respective heads are diametrically opposite each other, a) before the connection is made between the end fitting on the inside and the sleeve on the outside, the indicator is retained in the extended position by bearing against this sleeve, b) once this connection has been made with the projection of the end fitting locked axially by and behind the locking member, said legs of the indicator are spread apart by the contact of the projection so that the indicator is released from this extended position, and then c) radial pressure is applied by hand to said head of the indicator to move it from this extended position to the depressed position, in which it is kept by its retention arms being locked underneath said lower teeth, such that the indicator acts in this depressed position as a visual indicator of correct connection and also double-locks the connection by retaining the end fitting in addition to the locking member.

12. The inspection method as claimed in claim 11, wherein after step c), the resulting connection is unlocked by applying radial pressure simultaneously to these heads in such a way as to spread the corresponding legs and thus allow the end fitting to be withdrawn from the sleeve.

13. The inspection method as claimed in claim 11, wherein after step c), the resulting connection is unlocked by applying upward radial pressure to the head of the locking member and to the two lower pushers forming projections radially external to the junction between the legs of the indicator and their retention arms, in such a way as to spread the legs and thus allow the end fitting to be withdrawn from the sleeve.

\* \* \* \* \*

UNITED STATES PATENT AND TRADEMARK OFFICE
CERTIFICATE OF CORRECTION

PATENT NO.        : 8,336,919 B2
APPLICATION NO.   : 12/632195
DATED             : December 25, 2012
INVENTOR(S)       : Gillet et al.

Page 1 of 1

Figure 4:
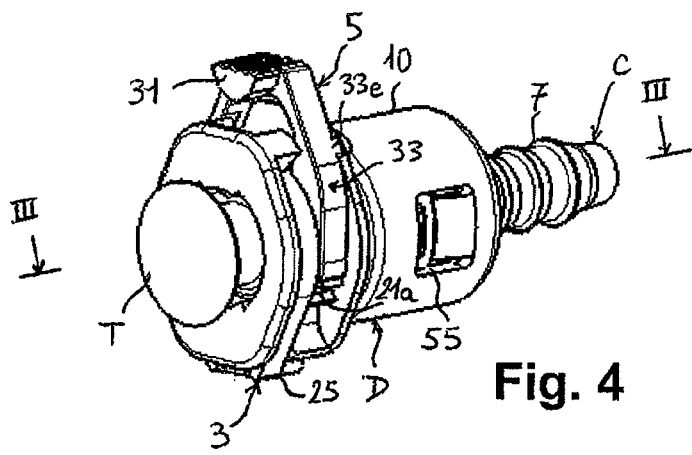
FIG. 4 is a perspective view of the coupling seen in FIG. 3 in this extended position of the indicator.

It is certified that error appears in the above-identified patent and that said Letters Patent is hereby corrected as shown below:

Column 5,
Line 8, "marked in FIG. 4" should read --marked III-III in FIG. 4--.

Signed and Sealed this
Nineteenth Day of March, 2013

Teresa Stanek Rea
*Acting Director of the United States Patent and Trademark Office*